Patented Nov. 25, 1947

2,431,601

UNITED STATES PATENT OFFICE 2,431,601

PRODUCTION OF SODIUM FERROCYANIDE

James H. Young, Niagara Falls, N. Y., assignor to E. I. du Pont de Nemours & Company, Wilmington, Del., a corporation of Delaware No Drawing. Application June 29, 1945,
Serial No. 602,419

6 Claims. (Cl. 23—77)

This invention relates to a new and improved process for the production of sodium ferrocyanide.

Sodium ferrocyanide is usually produced from calcium ferrocyanide by treatment of the latter with sodium carbonate or sodium chloride, or from spent iron oxides of coal gas purifiers by boiling the spent iron oxide with lime and leaching the soluble calcium ferrocyanide therefrom and converting it to sodium ferrocyanide by treatment with a sodium salt. The same result has been obtained by passing unpurified coal gas through a solution containing sodium hydroxide or sodium carbonate and finely divided ferrous carbonate. Sodium ferrocyanide is also made from sodium cyanide and ferrous sulfate by a well-known procedure.

Attempts have also been made to produce sodium ferrocyanide from aqueous sodium cyanide and finely divided iron. In view of the relatively high cost of sodium cyanide, as compared to gas works cyanide solutions, and in view of the rapidly diminishing rate of reaction between sodium cyanide and finely divided iron this latter process has never been utilized commercially for the production of sodium ferrocyanide, $Na_4Fe(CN)_6 \cdot 10H_2O$.

It has now been found, in accordance with the present invention, that the reaction between aqueous sodium cyanide and finely divided iron can be greatly accelerated and that the reaction can be carried out with high yields within a reasonable period of time despite the diminishing rate of reaction of these materials.

It is therefore an object of this invention to provide a new and improved process for the production of sodium ferrocyanide from aqueous sodium cyanide and finely divided iron.

Other objects of the invention will appear hereinafter.

The improved process of this invention comprises the step of reacting an aqueous solution of sodium cyanide with finely divided iron; the latter being present in large excess, at a temperature between 90° C. and 110° C. In order to avoid undue diminishing of the reaction it is preferred also to pass air into the reaction mass during the period of the reaction.

Heretofore, in carrying out the reaction between aqueous sodium cyanide and finally divided iron, it was considered necessary to avoid temperatures above about 65° C. to prevent decomposition of sodium cyanide to sodium carbonate, formic acid or ammonia. In accordance with this invention it has now been found that if iron is present in considerable excess, i. e., iron in the proportion of 8 to 20 or more times the weight of sodium cyanide in the aqueous solution, the temperature at which the reaction is carried out can be stepped up to between 90° C. and 110° C. without decomposition of sodium cyanide.

The iron should be finely divided, 20 mesh or smaller, and preferably should be fairly pure. Iron obtained by reducing finely divided iron oxide to iron by means of hydrogen is preferred. However, cast iron filings or finely divided iron obtained in other ways can also be used to good advantage.

Sodium cyanide of commercial grade containing 90% to 98% NaCN crystals may be used in carrying out the process of this invention. Preferably, the aqueous solution of sodium cyanide is prepared by dissolving the commercial sodium cyanide in ordinary tap water to form 20% to 50% aqueous solutions.

The reaction between the sodium cyanide solution and iron proceeds in accordance with the following reaction formula:

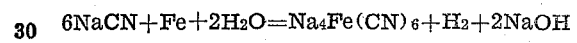

sufficient water being present in the reaction mass to form the decahydrate

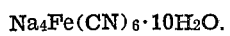

If a considerable quantity of water is evaporated during the reaction, a sufficient quantity of water to replace that evaporated may be added as the reaction proceeds. The reaction is preferably allowed to proceed until substantially all the sodium cyanide has reacted with the iron present. This may be determined by the well-known silver nitrate test for presence of cyanide. As a general rule the reaction will be completed within fifteen to twenty minutes.

After completion of the reaction the liquid is decanted or otherwise removed or drawn off from the reaction mass and iron particles therein removed, for example by filtering, magnetic separation or centrifuging. The liquid is then subjected to evaporation to remove a small proportion of the water therefrom. At this point there is often a precipitation of iron oxide which is probably present as the result of formation of ferrites during the reaction. The removal, by evaporation, of 5% to 10% of water from the liquid reaction product is usually sufficient to precipitate the iron oxide. If such iron oxide is formed, it should be removed, for example, by filtration before proceeding with evaporation of water from the solution of the ferrocyanide.

If the sodium cyanide used in the reaction contains such an amount of carbonate as to be objectionable as a contaminant in the final product, barium oxide or lime in aqueous solution may be added to the solution of ferrocyanide to precipitate the carbonate as barium carbonate or calcium carbonate before removal of the iron oxide. The precipitated carbonate can then be removed at the same time as the iron oxide, by filtering the mass.

After removal of any iron oxide or carbonate, the solution is further evaporated until crystals of sodium ferrocyanide are formed in the solution. Preferably, the evaporation is stopped at a point where the solution, after cooling to room temperature, will contain only between 1% and 10% of the ferrocyanide. The solution should not be evaporated to dryness to prevent formation of anhydrous sodium ferrocyanide and to prevent the presence of an unduly large amount of sodium hydroxide.

The solution, after the evaporation step, is cooled to room temperature. Preferably, this cooling step is carried out slowly to produce larger and purer crystals of sodium ferrocyanide. Seeding, by adding previously formed ferrocyanide crystals, will speed up crystal formation. After cooling, the ferrocyanide crystals are removed, for example, by filtration, centrifuging or in any other desired manner. The ferrocyanide crystals may, if desired, be washed in cold water, i. e., water having a temperature between 10° C. and 25° C. to remove excess caustic soda. If a still purer product is desired the ferrocyanide crystals may be dissolved in hot water and recrystallized. A single recrystallization of 94.8%

$Na_4FE(CN)_6 \cdot 10H_2O$ containing 0.77% NaOH gave a product of 99.6% $Na_4Fe(CN)_6 \cdot 10H_2O$ with less than 0.1% NaOH.

The reaction of the present invention may be carried out in a batch process or in a continuous manner, it being only necessary that the finely divided iron be present in an amount between 8 and 20 or more times the weight of sodium cyanide and that the temperature at which the reaction is carried out be between 90° C. and 110° C. If it is desired to reduce the diminishing of reaction speed it is also important to blow air through the reaction mass during the procedure of the reaction. The amount of air blown through the mass should be sufficient to noticeably agitate the reaction mass.

The following detailed examples illustrate, in detail, methods of carrying out the process of this invention, it being understood that the invention is not limited by the specific details therein set forth.

EXAMPLE I

Fifty cubic centimeters of a 31.4% aqueous solution of NaCN were added to 200 grams of finely divided iron (produced by reducing powdered iron oxide with hydrogen) in a round bottom, three-neck flask equipped with a motor-driven stirrer, a thermometer, and a tube leading compressed air below the liquid level. The reaction flask was heated on a hot-plate to maintain the reactants at a temperature of 100° C. During the reaction the compressed air was passed through the tube with sufficient volume to agitate the mass without operating the motor-driven stirrer. The reaction was continued until a test with silver nitrate indicated the absence of cyanide. The liquid was decanted from the solid and a second 50 cc. of a like solution of sodium cyanide added and reacted in a similar manner. This procedure of adding 50 cc. portions of sodium cyanide solution, reacting and decanting the liquid was repeated until 34 portions had been reacted. An additional 100 grams of the finely divided iron was then added to the flask and 13 additional successive portions of aqueous sodium cyanide reacted therewith. The results are tabulated below.

Total NaCN reacted_____grams__ 736.0
Total Fe reacted_____do____ 139.5
Total Fe added (200 at start+100 after 34th
  NaCN) _____grams__ 300.0
Total actual reaction time (approx.)__hrs__  48

Max. reaction rate 45.7 lbs. NaCN (=75 lbs. $Na_4Fe(CN)_6 \cdot 10H_2O$) per hour per cu. ft. Fe Avg. rate during 1st 6 hrs. 33.9 lbs. NaCN (=55.8 lbs. $Na_4Fe(CN)_6 \cdot 10H_2O$) per hour per cu. ft. Fe Avg. rate during 2nd (14 hrs.) 13.4 lbs. NaCN (=22.1 lbs. $Na_4Fe(CN)_6 \cdot 10H_2O$) per hour per cu. ft. Fe Avg. rate during 3rd (14 hrs.) 13.3 lbs. NaCN (=21.0 lbs. $Na_4Fe(CN)_6 \cdot 10H_2O$) per hour per cu. ft. Fe Avg. rate during 4th (14 hrs.) 12.0 lbs. NaCN (=19.7 lbs. $Na_4Fe(CN)_6 \cdot 10H_2O$) per hour per cu. ft. Fe

*Ferrocyanide recovery*

Recovery on first 15 aliquots NaCN was not estimated.

On last 32 aliquots: total wt. $Na_4Fe(CN)_6 \cdot 10H_2O$ crystals recovered=786.1 grams.

*Analyses of crystals*

|  | $Na_4FE(CN)_6 \cdot 10H_2O$ | NaOH |
|---|---|---|
|  | Per cent | Per cent |
| Batch 1—449.0 grams | 99.2 | 0.08 |
| Batch 2—80.4 grams | 99.2 | 0.08 |
| Batch 3—180.3 grams | 99.2 | 0.30 |
| Batch 4—56.8 grams | 97.5 | 0.54 |
| Batch 5—19.6 grams | 98.0 | 0.20 |

Ferrocyanide left in solution_____grams__  28.0
Ferrocyanide in crystals_____do____ 774.3

Total ferrocyanide found_____do____ 802.3

Theory yield ferrocyanide_____grams__ 826.0
Recovery _____per cent__  97.3

EXAMPLE II

Thirty connective aliquots of 50 cc. each of a 31.4% aqueous NaCN solution were reacted with 200 grams of cast iron filings in the same manner as in Example I.

Total reaction time_____hours__   12
Total NaCN added_____grams__ 471.0
Total Fe reacted_____do____  89.5
Total Fe added (50 grams after 23rd
  NaCN) _____grams__ 250.0

The results obtained were as follows:

Max. rate reaction 59.3 lbs. NaCN (=97.3 lbs. $Na_4Fe(CN)_6 \cdot 10H_2O$) per hour per cu. ft. Fe Avg. rate reaction for last ten hours 35.6 lbs. NaCN (=58.5 lbs. $Na_4Fe(CN)_6 \cdot 10H_2O$) per hour per cu. ft. Fe

*Ferrocyanide recovered*

Total weight crystals recovered=735 gm. (95% $Na_4Fe(CN)_6 \cdot 10H_2O$)

$Na_4Fe(CN)_6 \cdot 10H_2O$ by analyses=699 gm. in crystals $Na_4Fe(CN) \cdot 10H_2O$ by analyses=23 gm. in residual liquor Total $Na_4Fe(CN)_6 \cdot 10H_2O$=722 gm.

Theoretical yield $Na_4Fe(CN)_6 \cdot 10H_2O$=744 gm.

Recovery=93.50%

NaOH in crystals before one recrystallization=0.79%

NaOH after recrystallization=0.02%

$Na_4Fe(CN)_6 \cdot 10H_2O$ after recrystallization=99.40%

Reference in the specification and claims to parts, proportions and percentages, unless otherwise specified, refers to parts, proportions and percentages by weight.

Since it is obvious that many changes and modifications can be made in the above described details without departing from the nature and spirit of the invention, it is to be understood that the invention is not to be limited to said details except as set forth in the appended claims.

I claim:

1. A process for the production of sodium ferrocyanide which comprises reacting an aqueous solution of sodium cyanide and finely divided iron in the proportion of at least 8 to 20 parts by weight of iron per part of NaCN and at a temperature between 90° C. and 110° C.

2. A process for the production of sodium ferrocyanide which comprises reacting a 20% to 50% aqueous solution of sodium cyanide and finely divided iron in the proportion of at least 8 to 20 parts by weight of iron per part of NaCN and at a temperature between 90° C. and 110° C.

3. A process for the production of sodium ferrocyanide which comprises reacting an aqueous solution of sodium cyanide and finely divided iron in the proportion of at least 8 to 20 parts by weight of iron per part of NaCN and at a temperature between 90° C. and 110° C., and passing air into the reaction mixture during the course of the reaction.

4. A process for the production of sodium ferrocyanide which comprises reacting a 20% to 50% aqueous solution of sodium cyanide and finely divided iron in the proportion of at least 8 to 20 parts by weight of iron per part of NaCN and at a temperature between 90° C. and 110° C., and passing air into the reaction mixture during the course of the reaction.

5. A process for the production of sodium ferrocyanide which comprises reacting a 20% to 50% aqueous solution of sodium cyanide and finely divided iron in the proportion of at least 8 to 20 parts by weight of iron per part of NaCN and at a temperature between 90° C. and 110° C., removing iron particles from the liquid products of the reaction, evaporating until precipitation of any iron oxide takes place, removing said iron oxide, and continuing the evaporation until the solution, after cooling to room temperature, contains between 1% and 10% of sodium ferrocyanide, and removing the ferrocyanide crystals from the solution.

6. A process for the production of sodium ferrocyanide which comprises reacting a 20% to 50% aqueous solution of sodium cyanide and finely divided iron in the proportion of at least 8 to 20 parts by weight of iron per part of NaCN and at a temperature between 90° C. and 110° C., and passing air into the reaction mixture during the course of the reaction, removing iron particles from the liquid products of the reaction, evaporating until precipitation of any iron oxide takes place, removing said iron oxide, and continuing the evaporation until the solution, after cooling to room temperature, contains between 1% and 10% of sodium ferrocyanide, and removing the ferrocyanide crystals from the solution.

JAMES H. YOUNG.

REFERENCES CITED

The following references are of record in the file of this patent:

UNITED STATES PATENTS

| Number | Name | Date |
|---|---|---|
| 1,318,258 | Boberg | Oct. 17, 1919 |
| 1,398,453 | Washburn | Nov. 29, 1921 |